US 8,284,994 B2

(12) United States Patent
Miyazaki

(10) Patent No.: US 8,284,994 B2
(45) Date of Patent: Oct. 9, 2012

(54) IMAGE PROCESSING APPARATUS, IMAGE PROCESSING METHOD, AND STORAGE MEDIUM

(75) Inventor: Yasuyoshi Miyazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 601 days.

(21) Appl. No.: 12/539,036

(22) Filed: Aug. 11, 2009

(65) Prior Publication Data

US 2010/0046798 A1 Feb. 25, 2010

(30) Foreign Application Priority Data

Aug. 20, 2008 (JP) ................................. 2008-211842
Jun. 30, 2009 (JP) ................................. 2009-155684

(51) Int. Cl.
*G06K 9/00* (2006.01)
*H04N 5/228* (2006.01)
(52) U.S. Cl. ..................... 382/103; 382/291; 348/208.14
(58) Field of Classification Search .................. 382/100, 382/103, 106–107, 162, 168, 173, 181, 209, 382/232, 254, 274, 286–293, 305, 312, 154, 382/143; 348/143, 208.14, 441; 705/1.1
See application file for complete search history.

(56) References Cited

U.S. PATENT DOCUMENTS

| | | | | |
|---|---|---|---|---|
| 6,724,915 B1* | 4/2004 | Toklu et al. | .................... | 382/103 |
| 7,423,669 B2* | 9/2008 | Oya et al. | ................. | 348/208.14 |
| 7,710,498 B2* | 5/2010 | Kondo et al. | ................. | 348/441 |
| 7,856,360 B2* | 12/2010 | Kramer et al. | ................. | 705/1.1 |
| 7,899,208 B2* | 3/2011 | Kondo et al. | ................. | 382/103 |
| 2004/0247174 A1* | 12/2004 | Lyons et al. | ................. | 382/154 |
| 2007/0279492 A1* | 12/2007 | Ohnishi | ....................... | 348/143 |
| 2009/0175496 A1* | 7/2009 | Kondo et al. | ................. | 382/103 |

FOREIGN PATENT DOCUMENTS

JP 2008-011497 A 1/2008

* cited by examiner

*Primary Examiner* — Seyed Azarian
(74) *Attorney, Agent, or Firm* — Canon USA Inc IP Division

(57) ABSTRACT

In an image processing apparatus that performs tracking processing based on a correlation between frame images, when an object that is a tracking target is missed and a frame indicating the tracking target is set to a uniform background during tracking processing, a display of the frame may blur. An image processing apparatus is provided which detects a tracking target candidate region which has a highest correlation with a set tracking target region, calculates a difference between an evaluation value acquired in the tracking target candidate region and an evaluation value acquired in a peripheral region of the tracking target candidate region, and stops tracking if the difference is less than a threshold value.

6 Claims, 4 Drawing Sheets

IMAGE PROCESSING APPARATUS, IMAGE PROCESSING METHOD, AND STORAGE MEDIUM

BACKGROUND OF THE INVENTION

1. Field of the Invention

The present invention relates to a technique for tracking an object by acquiring a correlation between images.

2. Description of the Related Art

Some digital cameras and video cameras display an image to be captured on a monitor in real time and allow a user to specify a region on the movie displayed on the monitor to control exposure and focus of the object existing in the region.

Other digital cameras and video cameras allow the user to specify an arbitrary object on the movie displayed on the monitor in order to specify a main object as a tracking target to be tracked. Japanese Patent Application Laid-Open No. 2008-011497 discusses a configuration of a camera which continuously tracks an initially-specified main object by calculating correlation between frame images of the movie and continuously detecting a region similar to the initially-specified main object in time series.

However, if the object of the tracking target widely moves, common portions between the frame images decrease even if the frame images include the same object. Thus, the object in the frame image cannot be recognized as the same object, and tracking may fail.

With reference to FIGS. 4A, 4B, and 4C, an example will be described. In FIGS. 4A, 4B, and 4C, rectangular-shaped frames indicated by bold lines are tracking frames indicating the object specified by the user or the region of the main object detected by the tracking processing. The tracking frame is set a bit larger than the specified object so that the object (in this example, a person's face) specified by the user can fit into the frame.

For example, in FIG. 4A, it is supposed that the person's face which is initially specified as the main object is successfully tracked by correlation calculation. If the person abruptly moves, an image of the person is largely blurred as illustrated in FIG. 4B. Since the tracking frame illustrated in FIG. 4A includes a part of background behind the person, in the frame image illustrated in FIG. 4B, the background is determined as the region that has the highest correlation rather than the person. Thus, the background may be selected as a region of a new main object.

If only a region having low correlation is detected, it may be determined that the main object is missed. However, when a posture or a direction of the main object is changed, high correlation between the regions cannot be always acquired, even though the main object exists in the image. Thus, in order to enable tracking of the object even when the object moves or changes its posture to some degree, it is desired that a region having the highest correlation in an image is selected as the region of the main object, even though only the region having the low correlation exists in the image.

However, in this case, a part of the background may be selected as a region of a new main object as illustrated in FIG. 4B. If the background is a uniform object having low contrast, many similar regions exist in the periphery. Therefore, as illustrated in FIG. 4C, the tracking frame moves around the background and looks blurred.

SUMMARY OF THE INVENTION

The present invention is directed to an image processing apparatus and an image processing method that can prevent a display of a frame indicating a tracking target from blurring using correlation between images when an object that is the tracking target is missed during tracking processing.

According to an aspect of the present invention, an image processing apparatus that performs tracking processing in frame images that constitute a movie by detecting an object existing in a tracking target region set in a first image, in a second image, includes a setting unit configured to set the tracking target region in the first image, a tracking unit configured to detect in the second image a tracking target candidate region which has a highest correlation with the tracking target region set by the setting unit, a determination unit configured to calculate a difference between an evaluation value acquired in the tracking target candidate region and an evaluation value acquired in a peripheral region of the tracking target candidate region, and a control unit configured to update the tracking target region with the tracking target candidate region if the difference is equal to or more than a threshold value and to reset the tracking target region if the difference is less than the threshold value.

According to another aspect of the present invention, a method for processing an image to perform tracking processing in frame images that constitute a movie by detecting an object existing in a tracking target region set in a first image, in a second image, includes setting the tracking target region in the first image, detecting in the second image a tracking target candidate region which has a highest correlation with the tracking target region, calculating a difference between an evaluation value acquired in the tracking target candidate region and an evaluation value acquired in a peripheral region of the tracking target candidate region, and updating the tracking target region with the tracking target candidate region if the difference is equal to or more than a threshold value and resetting the tracking target region if the difference is less than the threshold value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

In an exemplary embodiment of the present invention, an image processing apparatus will be described using a digital camera as an example.

Figure 1:
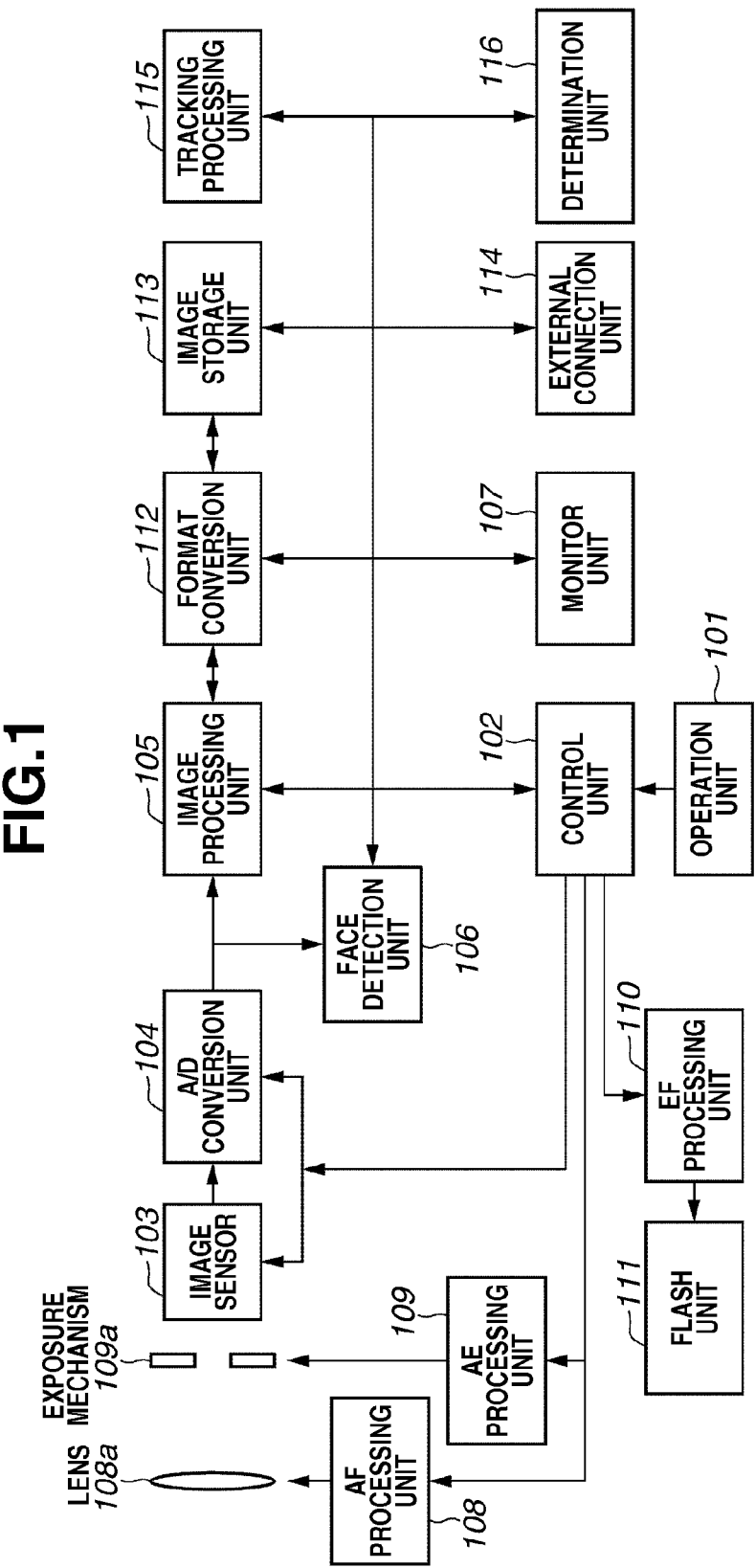
FIG. 1 is a block diagram illustrating a functional configuration of a digital camera according to an exemplary embodiment of the present invention.

FIG. 1 is a block diagram illustrating a functional configuration of the digital camera according to the present exemplary embodiment.

An operation unit 101 includes switches and buttons to be operated by a user to input various instructions to the digital camera. The operation unit 101 includes a shutter switch. When the shutter switch is half pressed, a signal SW1 is generated and transmitted from the operation unit 101 to a control unit 102.

Further, when the shutter switch is fully pressed, a signal SW2 is generated and transmitted from the operation unit 101 to the control unit 102.

The control unit 102 controls a movement of each unit illustrated in FIG. 1 according to the instructions from the operation unit 101.

An image sensor 103 receives light entering through a lens 108a and an exposure mechanism 109a and outputs an electric charge according to a light amount. A charge couple device (CCD) and a complementary metal oxide semiconductor (CMOS) sensor which have a photoelectric conversion function may be used for the image sensor 103.

An analog/digital (A/D) conversion unit 104 performs sampling, gain adjustment and A/D conversion on an analog image signal output from the image sensor 103 and outputs a digital image signal.

An image processing unit 105 performs various image processing on the digital image signal output from the A/D conversion unit 104 and outputs the processed digital image signal. For example, the image processing unit 105 converts the digital image signal received from the A/D conversion unit 104 into a YUV image signal and outputs the YUV signal.

A face detection unit 106 performs face detection on the digital image signal received from the A/D conversion unit 104 and notifies the control unit 102 of information about the region. The information acquired by the face detection includes a position, an area, and reliability (certainty as a shape of a face) according to brightness in a light shielded region within a screen of the image sensor.

A monitor unit 107 includes a small liquid crystal screen for displaying the image according to image data processed by the image processing unit 105.

A tracking processing unit 115 determines where in subsequent image frames a region considered to be the same as the face detected in a frame image exists by using correlation between the frame images. Further, the tracking processing unit 115 calculates a position, an area and a size of the region. A movement of the camera itself is also calculated using an angular speed sensor. According to the present exemplary embodiment, two images placed in a time sequential order are compared to each other to acquire information about a difference thereof. Using the difference information, the regions considered to have the same face are extracted. The tracking processing unit 115 continuously extracts the regions considered to have the same face in order to track a face area detected by the face detection unit 106.

A determination unit 116 acquires an evaluation value from the correlation calculated by the tracking processing unit 115 and determines whether the current frame is set on the object or on the background uniform surface. The determination method is a distinctive feature of the present exemplary embodiment and will be described below in detail.

Based on an automatic focusing (AF) evaluation value acquired from the image obtained by the image processing unit 105, an automatic focusing (AF) processing unit 108 operates the lens 108a to focus on the object. Further, based on a light metering value acquired from the image obtained by the image processing unit 105, an automatic exposing (AE) processing unit 109 operates the exposure mechanism 109a so that the screen has an optimum brightness.

When the control unit 102 receives a notification of the signal SW1 from the shutter switch, the AF processing unit 108 and the AE processing unit 109 perform the focus control and the exposure control using the newest image at that point.

Upon receiving a notification of the signal SW2 from the shutter switch (more specifically, a notification that the shutter switch is fully pressed), the control unit 102 determines whether to emit the flash. The user may previously set whether to emit the flash using the operation unit 101, so that the control unit 102 can determine by reading the setting data. Further, the control unit 102 can automatically determine by detecting darkness in the circumstance.

As a result of the determination, if it is determined that the flash is emitted, the control unit 102 controls the EF processing unit 110 to cause the flash unit 111 to previously emit the flash to calculate an amount of emitted flash. Then, the control unit 102 causes the flash unit 111 to emit an amount of main flash which is calculated based on the previously emitted flash and performs main image capturing.

The format conversion unit 112 converts the format of the digital image signal (image data) output from the image processing unit 105 when the main image capturing is performed into the JPEG format, for example, and outputs the digital image signal to the image storage unit 113. The image storage unit 113 stores the image data in the converted format received from the format conversion unit 112 in a memory (not illustrated) of the digital camera or an external memory inserted in the digital camera.

An external connection unit 114 functions as an interface for connecting the digital camera to an external apparatus such as a personal computer (PC) and a printer.

Next, control for determining whether the object is successfully tracked, more specifically, whether tracking of a moving object is to be stopped is based on determination on a uniform surface.

Figure 2:
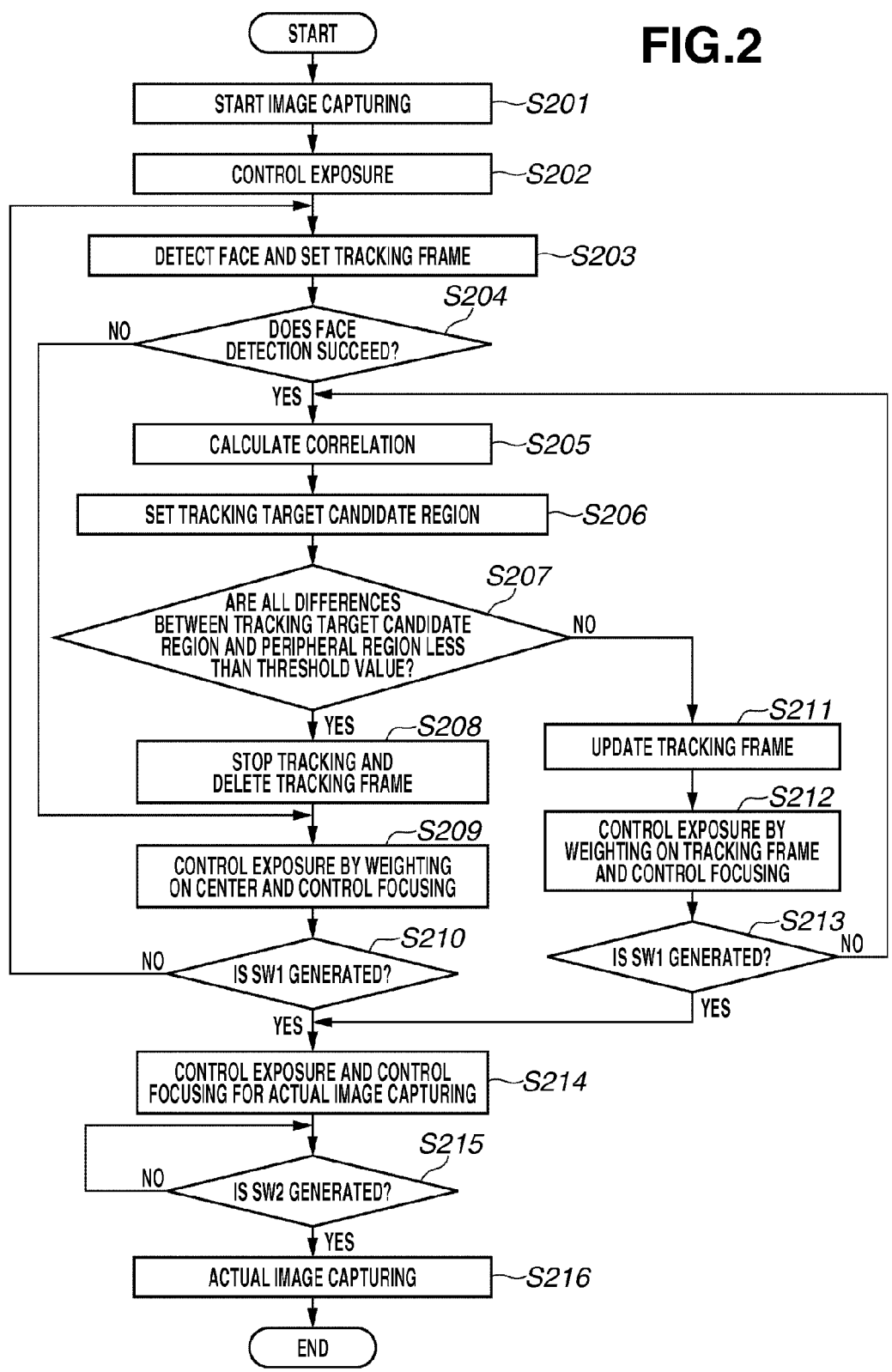
FIG. 2 is a flowchart illustrating tracking processing according to the exemplary embodiment of the present invention.

FIG. 2 is a flowchart illustrating tracking processing according to the present exemplary embodiment. When the user sets the digital camera to an image capturing mode, the processing of this flowchart is started.

In step S201, when the user sets the digital camera to the image capturing mode, the shutter is opened and light enters the image sensor 103 through the lens 108a and the exposure mechanism 109a. The frame images continuously created by the image sensor 103 are displayed on the monitor unit 107 as a movie so that the user can observe a state of the object in real time.

In step S202, the control unit 102 performs evaluative light metering (for example, center-weighted light metering) on the movie to control exposure.

In step S203, the control unit 102 reads out the newest frame image and transmits the frame image to the face detection unit 106 which detects a face area from the frame image. As a method for detecting a face, for example, a method using characteristics of portions included in the face such as eyes, a nose and a mouth can be used. For example, if many portions that match with standard patterns and characteristics (shapes and positions) of eyes, nose and mouth that are previously stored in the camera are included and arranged in a fine balance, this region can be estimated as the face area.

When a plurality of face areas is detected, all of the plurality of face areas may be set as the tracking target region. Further, points may be given to each of a position and a size of the face, and reliability as a face (a degree of matching with the standard patterns), and only one face which gains the highest points may be set as the tracking target region. Moreover, the user may operate the operation unit 101 to select any one of the plurality of face areas. The movie may be displayed with the tracking frame superimposed thereon so that the user can recognize the position and the size of the tracking target region. Furthermore, the image data corresponding to the tracking target region is transmitted to the tracking processing unit 115 to be used as reference image data in the tracking processing.

Figure 3A:
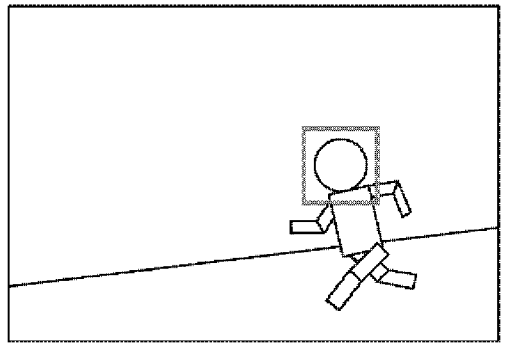
FIGS. 3A, 3B, 3C and 3D illustrate states in which the tracking processing is stopped since a tracking target candidate region is set in a uniform background according to the exemplary embodiment of the present invention.

FIG. 3A illustrates a state described above and the image displayed on the monitor unit 107 where the tracking frame indicated by a bold line is superimposed on the detected face area. The tracking frame is set a bit larger than the face area so that the detected face area can be completely included in the tracking frame.

In step S204, the control unit 102 determines whether the face area can be detected in step S203. If the face area is detected (YES in step S204), the processing proceeds to step S205. If the face area is not detected (NO in step S204), the processing proceeds to step S209.

In step S205, the control unit 102 newly reads out the frame image, and performs the tracking processing on the frame image. The tracking processing unit 115 cuts out a partial region from the newly read out frame image while the size or the coordinate of the newly read out frame image is being gradually shifted, and an evaluation value of the cut out region is acquired from information about brightness, color difference and contrast of the cut out region.

In step S206, the tracking processing unit 115 compares an evaluation value acquired from the reference image data which has been previously acquired to each evaluation value of all cut out regions. From among the cut out regions, namely the target regions, the region which is determined to have the highest correlation with the reference image data is selected and set as a tracking target candidate region.

Figure 3B:
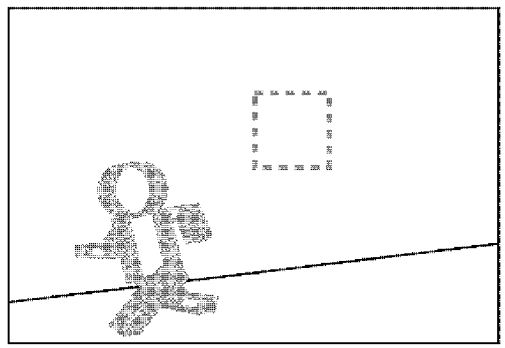

FIG. 3B illustrates a state described above. In FIG. 3B, since the person whose face is detected as the face area moves rapidly and thus the image of the person becomes blurred, the background indicated by a dotted line is selected as the tracking target candidate region which has the highest correlation with the region surrounded by the tracking frame illustrated in FIG. 3A.

In step S207, the determination unit 116 sets four peripheral regions acquired by shifting the tracking target candidate region to four positions (i.e., upper left, upper right, lower left, and lower right) centering on the set tracking target candidate region and acquires evaluation values of the four peripheral regions. As a shifting amount, for example, 50 to 100 percent of each of a vertical width and a lateral width of the tracking target candidate region may be set. The shifting amount may be acquired as an experimentally optimum value considering the size and previous movement of the object set as the tracking target region.

Figure 3C:
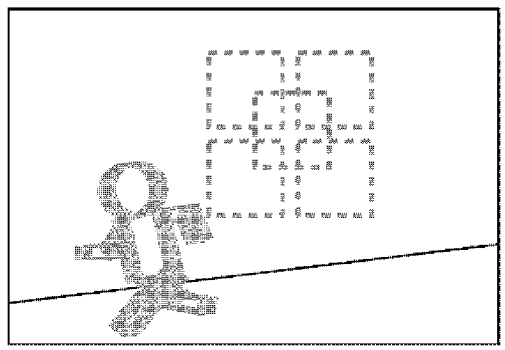

FIG. 3C illustrates a state described above. In FIG. 3C, the peripheral regions shifted in four oblique directions are set centering on the tracking target candidate region illustrated in FIG. 3B.

The determination unit 116 acquires the differences between each of the evaluation values acquired from four peripheral regions and the evaluation value acquired from the tracking target candidate region. If all of the differences are less than a threshold value (YES in step S207), the processing proceeds to step S208. If not all of the differences are less than the threshold value, more specifically, if even one region has the evaluation value equal to or more than the threshold value, the processing proceeds to S211.

Figure 3D:
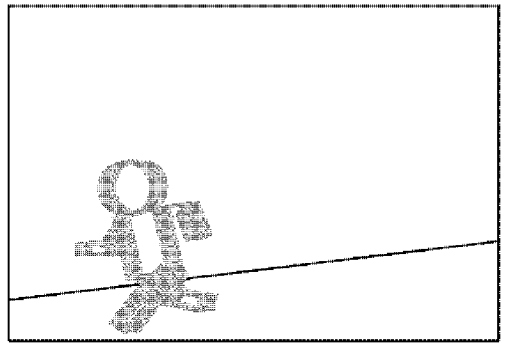
Figure 4A:
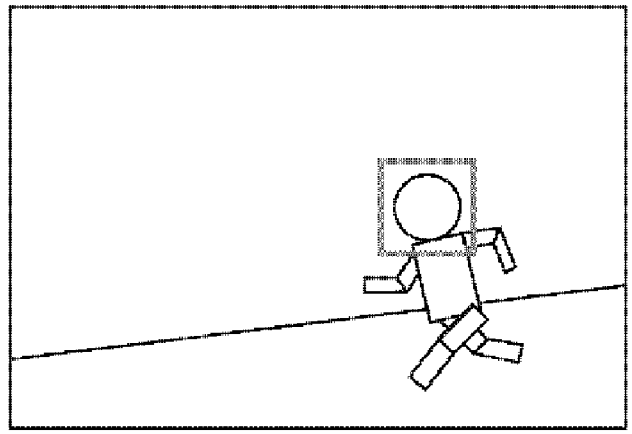
FIGS. 4A, 4B, and 4C illustrate a conventional method for updating a tracking frame.
Figure 4B:
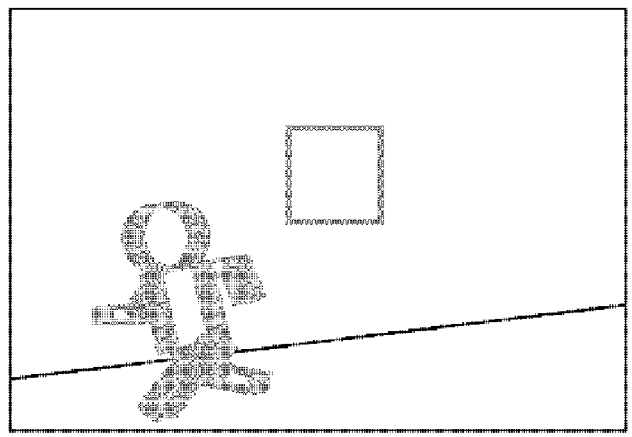
Figure 4C:
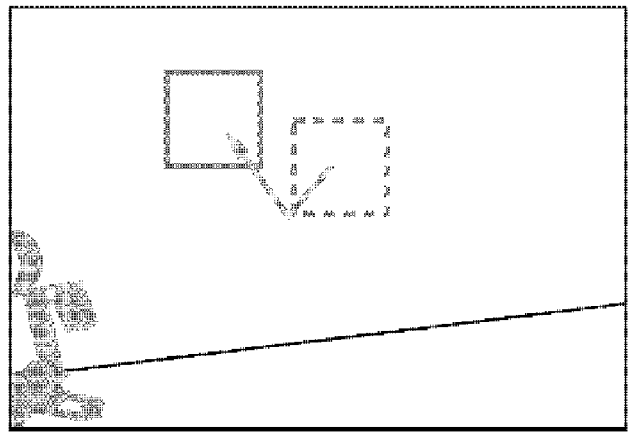

In step S208, the control unit 102 deletes and resets the information about the tracking target region and the reference image data and stops the tracking processing as illustrated in FIG. 3D. The control unit 102 deletes the tracking frame from the image displayed on the monitor unit 107. As a result of the determination in step S207, if the tracking target candidate region is similar to all of the four peripheral regions, the tracking target candidate region may be set in the uniform background which has the low contrast. The tracking processing is stopped because, if the tracking processing is continued as it is, many regions which have the high correlation exist in the periphery as described above using FIGS. 4A, 4B, and 4C. Thus, the position of the tracking frame becomes unstable and blurred.

In step S209, since the tracking target is missed, the control unit 102 causes the AF processing unit 108 to perform the focus control so that the object existing on a center part is roughly focused on and the AE processing unit 109 to perform the exposure control by the center-weighted light metering.

In step S210, the control unit 102 monitors whether the signal SW1 is generated by half pressing the shutter switch of the operation unit 101. If the signal SW1 is generated (YES in step S210), the processing proceeds to step S214. If the signal SW1 is not generated (NO in step S210), the processing returns to step S203 and the control unit 102 newly detects the tracking target region and detects the face area from the frame image newly read out by the face detection unit 106.

If the processing proceeds from step S207 to step S211, the control unit 102 determines that the tracking is successfully performed and updates the tracking target region with the tracking target candidate region as the new tracking target region. Further, the control unit 102 displays the image of the new tracking target region on which the tracking frame is superimposed, on the monitor unit 107.

In step S212, the AF processing unit 108 and the AE processing unit 109 respectively control the focusing and the exposure by performing the greatest weighting on the light metering value and the AF evaluation value that are acquired from the track target region.

In step S213, the control unit 102 monitors whether the signal SW1 is generated by half pressing the shutter switch of the operation unit 101. If the signal SW1 is generated (YES in step S213), the processing proceeds to step S214. If the signal SW1 is not generated (NO in step S213), the processing returns to step S205 to continue the tracking processing.

If the signal SW1 is generated in steps S210 and S213, then in step S214, the AF processing unit 108 and the AE processing unit 109 respectively control the focusing and the exposure for the main image capturing. If the tracking target region exists, the control unit 102 controls the AF processing unit 108 and the AE processing unit 109 to adjust the focus on the tracking target region and the brightness to the optimum value. If the tracking target region does not exist, the control unit 102 controls the AF processing unit 108 and the AE processing unit 109 to prioritize the focus and the light metering value at the center part to adjust the whole screen to an optimum state.

In step S215, the control unit 102 waits until the signal SW2 is generated by fully pressing the shutter switch of the operation unit 101. If the signal SW2 is generated (YES in step S215), the processing proceeds to step S216, and the control unit 102 generates still image data and stores the still image data in the image storage unit 113.

As described above, according to the exemplary embodiment, a problem can be prevented that the tracking frame is set to and blurred on the uniform background which has the low contrast.

Further, according to the exemplary embodiment, four peripheral regions are set around the tracking target candidate region to determine whether the tracking can be continued, however, the peripheral regions may be set only to determine the degree of the correlation between the tracking target candidate region and the peripheral region. Therefore, a number of the peripheral regions to be set may be, for example, three or six. Further, the peripheral regions may be set not only in the four oblique directions but also in vertical and lateral directions.

In the exemplary embodiment, as an example, the face area detected by the face detection unit 106 is set as the tracking target region. However, as discussed in Japanese Patent Application Laid-Open No. 2008-011497, the user may operate the operation unit 101 to specify the arbitrary tracking target region. By employing the method described above, not only a person's face but also animals and vehicles can be set as the tracking target.

Alternatively, the tracking processing unit 115 may extract moving objects considering the differences between the frame images, and the user may operate the operation unit 101 to select any one of the plurality of face areas.

More specifically, the present invention can be applied to the configuration that includes the tracking processing unit 115 for determining where in a subsequent second image a region considered to be the same as the face detected in a first image exists by using the correlation between the frame images.

As described above, the exemplary embodiment of the present invention is described referring to the digital camera as an example. Instead of the digital camera, the present invention can be applied to a video camera. Moreover, it can be applied also to a computer system such as a monitoring system that receives movie data from a camera connected to the system and performs the tracking processing on the received movie data in the image processing unit.

Further, the present invention can be achieved as follows. Firstly, a computer-readable storage medium (or recording medium) storing a program code of software for realizing functions of the exemplary embodiment described above is supplied to a system or an apparatus. A computer (or a central processing unit (CPU) or a micro processing unit (MPU)) of the system or the apparatus reads out and executes the program code stored in the storage medium.

In this case, the program code itself read out from the storage medium realizes the functions of the present exemplary embodiment described above, and thus the storage medium storing the program code constitutes the present invention.

Furthermore, in addition to execution of the program code read out by the computer, the function of the exemplary embodiment described above can be achieved as follows. More specifically, an operating system (OS) running on the computer performs a part of or all of the actual processing based on instructions of the read out program code, and the above-described functions of the exemplary embodiment can be realized by the processing.

The computer-readable storage medium for storing the program code includes, for example, a floppy disk, a hard disk, a read only memory (ROM), a random access memory (RAM), a magnetic tape, a non-volatile memory card, a compact disk ROM (CD-ROM), a CD recordable (CD-R), a digital versatile disk (DVD), an optical disk, and a magneto-optical (MO) disk. Further, a computer network such as a local area network (LAN) and a wide area network (WAN) can be used for supplying the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2008-211842 filed Aug. 20, 2008, and No. 2009-155684 filed Jun. 30, 2009, which are hereby incorporated by reference herein in their entireties.

What is claimed is:

1. An image processing apparatus that performs tracking processing in frame images that constitute a movie by detecting an object existing in a tracking target region set in a first image, in a second image, the image processing apparatus comprising:
    a setting unit configured to set the tracking target region in the first image;
    a tracking unit configured to detect in the second image a tracking target candidate region which has a highest correlation with the tracking target region set by the setting unit;
    a determination unit configured to calculate a difference between an evaluation value acquired in the tracking target candidate region and an evaluation value acquired in a peripheral region of the tracking target candidate region; and
    a control unit configured to update the tracking target region with the tracking target candidate region if the difference is equal to or more than a threshold value and to reset the tracking target region if the difference is less than the threshold value.

2. The image processing apparatus according to claim 1, wherein the setting unit is further configured to set a region where a person's face is detected, as the tracking target region.

3. The image processing apparatus according to claim 1, wherein the setting means is further configured to set the peripheral region about the tracking target candidate region based on a size of the tracking target region.

4. The image processing apparatus according to claim 1, wherein the setting means is further configured to set the peripheral region about the tracking target candidate region based on a movement of the tracking target region.

5. A method for processing an image to perform tracking processing in frame images that constitute a movie by detecting an object existing in a tracking target region set in a first image, in a second image, the method comprising:
    setting the tracking target region in the first image;
    detecting in the second image a tracking target candidate region which has a highest correlation with the tracking target region;
    calculating a difference between an evaluation value acquired in the tracking target candidate region and an evaluation value acquired in a peripheral region of the tracking target candidate region; and
    updating the tracking target region with the tracking target candidate region if the difference is equal to or more than a threshold value and resetting the tracking target region if the difference is less than the threshold value.

6. A non-transitory computer-readable storage medium containing computer-executable instructions utilized in an image processing apparatus for processing an image to perform tracking processing in frame images that constitute a movie by detecting an object existing in a tracking target region set in a first image, in a second image, the medium comprising:

computer-executable instructions for setting the tracking target region in the first image;

computer-executable instructions for detecting in the second image a tracking target candidate region which has a highest correlation with the tracking target region;

computer-executable instructions for calculating a difference between an evaluation value acquired in the tracking target candidate region and an evaluation value acquired in a peripheral region of the tracking target candidate region; and computer-executable instructions for updating the tracking target region with the tracking target candidate region if the difference is equal to or more than a threshold value and resetting the tracking target region if the difference is less than the threshold value.

* * * * *